United States Patent [19]

Pate

[11] 4,073,514
[45] Feb. 14, 1978

[54] COMBINATION PIPE FITTING AND RETAINER RING

[75] Inventor: Harold T. Pate, Solon, Ohio

[73] Assignee: Indian Head Inc., New York, N.Y.

[21] Appl. No.: 690,156

[22] Filed: May 26, 1976

[51] Int. Cl.² .......................................... F16L 25/00
[52] U.S. Cl. ................................... 285/127; 285/158; 285/177; 285/325; 285/340; 285/417; 285/423
[58] Field of Search ............... 285/340, DIG. 3, 319, 285/158, 320, 177, 423, 417, 127, 325, 383; 403/371, 372; 174/65 R

[56] References Cited

U.S. PATENT DOCUMENTS

| 1,809,582 | 6/1931 | Church | 285/340 |
| 2,147,353 | 2/1939 | Scholtes | 285/340 X |
| 2,225,208 | 12/1940 | Crilkmer | 285/340 X |
| 2,357,755 | 9/1944 | Moll | 285/325 X |
| 2,785,910 | 3/1957 | Munger | 285/423 X |
| 2,950,132 | 8/1960 | Kolsuta | 285/340 X |
| 2,955,851 | 10/1960 | Scott | 285/127 |
| 3,204,988 | 9/1965 | Ouderkirk et al. | 285/423 X |
| 3,389,923 | 6/1968 | Love et al. | 285/423 X |
| 3,976,314 | 8/1976 | Graham | 285/340 |

*Primary Examiner*—Dave W. Arola
*Attorney, Agent, or Firm*—William R. Laney

[57] ABSTRACT

The combination of a spring metal retainer ring with a pipe or conduit fitting having an annular seat for accommodation of the retainer ring, and further having a cylindrical passageway therein coaxial with the ring for receiving a pipe or conduit through the ring. The retainer ring includes an annular band which has a plurality of circumferentially spaced tabs projecting radially outwardly at an obtuse angle with respect to the plane of the band and projecting axially with respect to the axis of the band. The retainer ring further includes a plurality of circumferentially spaced, radially inwardly directed tabs connected thereto, and extending in the opposite axial direction from the direction of axial extension from the band of said first mentioned tabs.

30 Claims, 19 Drawing Figures

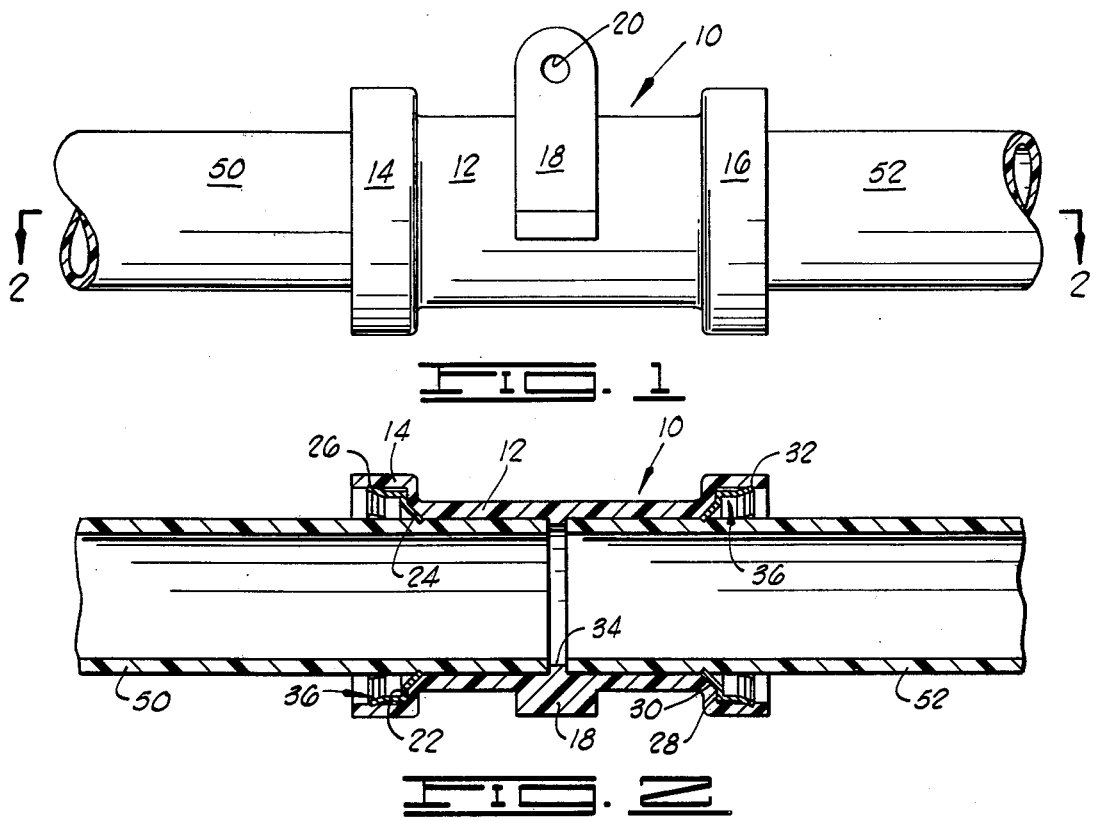
FIG. 1
FIG. 2
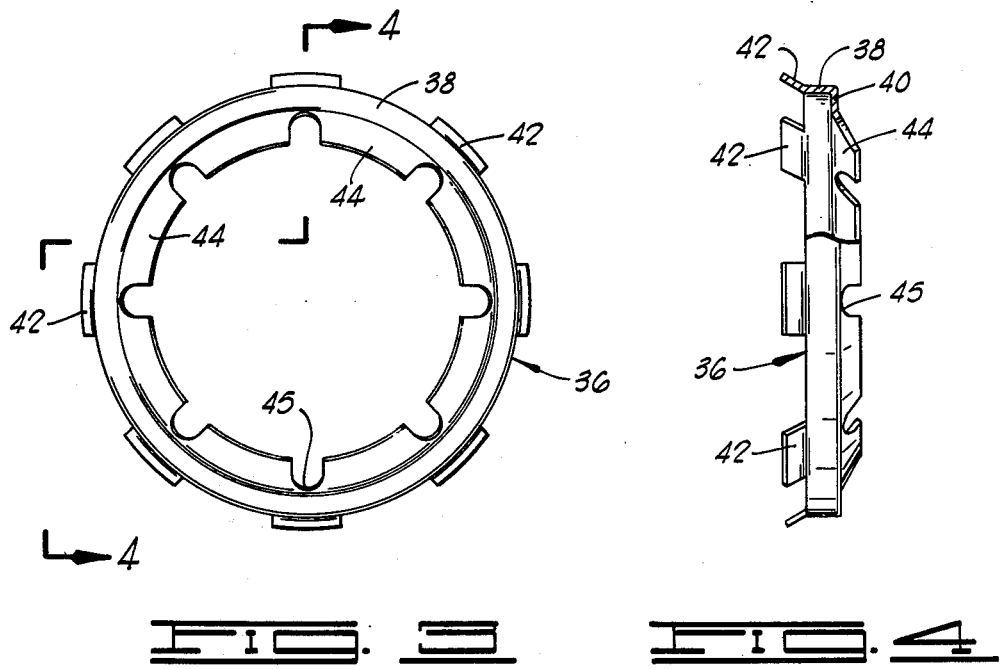
FIG. 3    FIG. 4

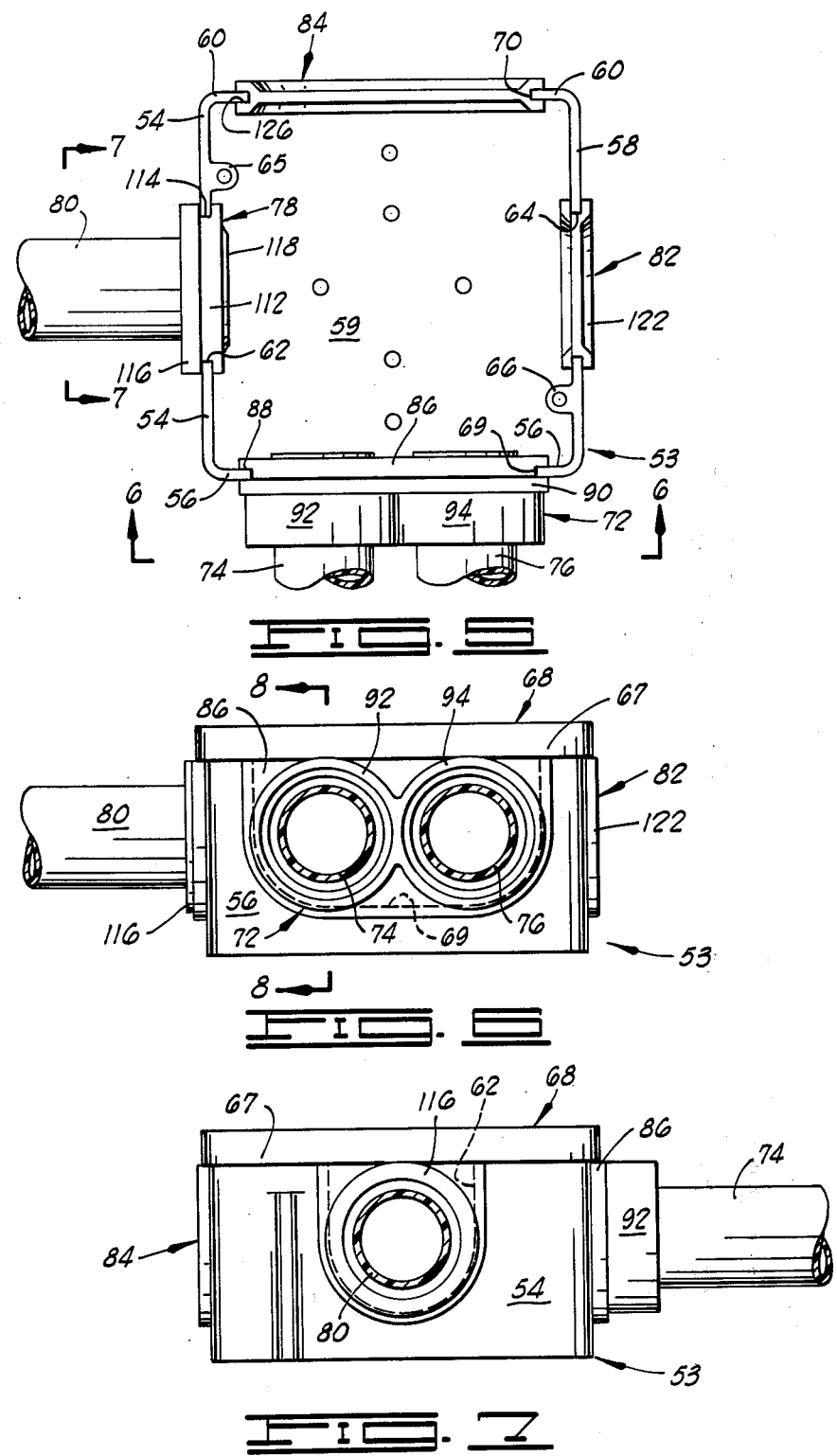

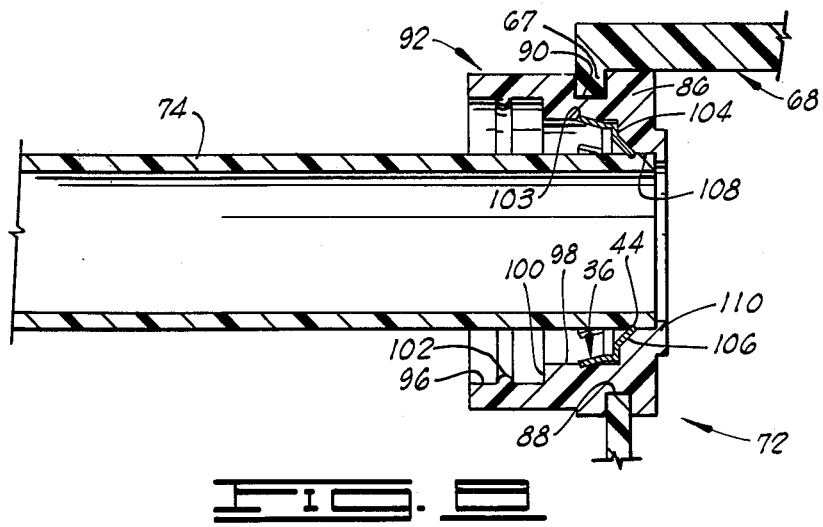
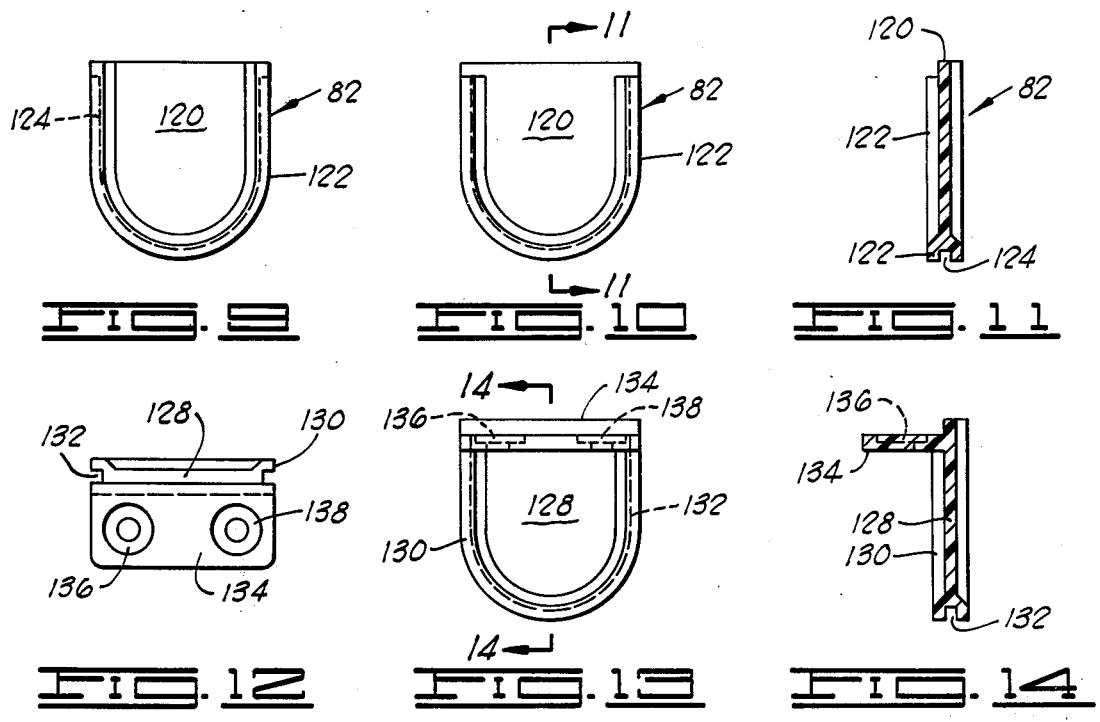

COMBINATION PIPE FITTING AND RETAINER RING

BACKGROUND OF THE INVENTION

Field of the Invention

This invention relates to pipe or tubing couplings, and more particularly, but not by way of limitation, to synthetic resin pipe fittings which surround and engage a spring metal retainer ring which is adapted to receive and engage a conduit or tube inserted in the fitting and through the ring.

Brief Description of the Prior Art

It is often desirable to provide a joint or coupling by means of which a pipe or conduit can be inserted in a female fitting or in the open end of a larger pipe or conduit and retainer in this position without the use of threads, a bolt or a special fastening member, which devices require apertures or holes or threads to be machined in one or both of the structural elements thus interconnected. A variety of interlocking structures for accomplishing this type of joinder have heretofore been proposed.

One general class of such structures includes those in which an annular spring metal member is interposed between the outer peripheral wall of the internal pipe or conduit and the surrounding fitting or larger conduit so as to form an interlock between the two structural elements. In many instances, the annular spring metal member is used in conjunction with an elastomeric sealing element to afford a sealing function as well as mechanical retention of the structures in interlocked relation.

The annular spring metal members employed for this type of construction are often provided with inwardly projecting teeth or tabs which are oriented to spring outwardly for the purpose of passing the end of the internal tubing or conduit when it is inserted in the fitting or larger conduit, but to bite into the outer periphery of such internal conduit when it is moved in a reverse direction, thereby preventing disconnection or extrication of the internal conduit from the surrounding fitting. Structures of this sort are illustrated in Leadbetter et al. U.S. Pat. No. 3,312,483; Ouderkirk et al. U.S. Pat. No. 3,204,988; Kocsuta U.S. Pat. No. 2,950,132; Crickmer U.S. Pat. No. 2,225,208; Kuestermeier U.S. Pat. No. 2,158,757; Wurzel et al. U.S. Pat. No. 3,359,021; Kody U.S. Pat. No. 3,291,510; Hamburg U.S. Pat. No. 2,591,205; Hamburg U.S. Pat. No. 3,633,944; Blomquist et al. U.S. Pat. No. 3,166,945; MacDonald U.S. Pat. No. 3,874,709 and Nathan U.S. Pat. No. 2,230,725.

In general, the structures disclosed in these patents, and of the general sort described, include, as the instrumentality for effecting interlocking between the internal conduit and the exterior fitting, a metal ring which has radially inwardly projecting teeth which are inclined in an axial direction. This geometry permits them to be sprung radially outwardly slightly when the free end of the internal pipe is telescoped into the fitting or larger diameter pipe during assembly. The teeth are, however, drawn back in the opposite direction to cause them to bite into the exterior peripheral surface of the internal conduit when an axially acting force is applied to it tending to withdraw it from the fitting or exterior pipe. The radially inwardly projecting teeth are usually connected at their radially outer base portions to some type of band which may be cylindrically shaped and lie, generally speaking, in a plane which extends parallel to the axis of the internal tubing. In some cases, the band is formed as a flat disc and lies in a plane extending normal to this axis. The band is usually seated against a restraining seat or shoulder formed at some location in the external fitting or pipe so that it resists displacement by a force applied to it through the radially inwardly projecting teeth, and tending to displace it radially outwardly. In this way, when the teeth are pulled back toward the central longitudinal axis of the interior tubing by the exertion of a force tending to remove this tubing from the joint, the teeth cannot yield radially outwardly, and must bite into the tubing to thereby prevent its removal from the joint. Such structures are especially effective when the internal tubing or conduit is of synthetic resin construction, and thus can be indented slightly by the metallic teeth so as to afford a positive mechanical engagement which provides high resistance to disconnection of the joint.

Various other forms of the metallic ring or annular band used in joints of this type have been proposed, with various types of bends made in the metallic structure to afford better anchoring qualities or achieve adaptation to certain particular types of external fittings or conduits.

BRIEF DESCRIPTION OF THE PRESENT INVENTION

The present invention provides an improved combination pipe fitting and retainer ring useful in coupling a structure containing the combination to the outer periphery of a tubular member. The retainer ring, while of the general type hereinbefore described as characterizing related structures previously manufactured and employed for this type of application, provides certain advantages and improvements with respect to those previously known structures, and particularly in the ease with which the combination pipe fitting and retainer ring may be assembled and interconnected to each other, and the effectiveness with which a tubular member or pipe can be joined to the assembled combination by a firmly engaged interlock.

Broadly described, the combination fitting and retainer ring of the invention includes a fitting which defines a circular opening or a cylindrical bore adapted to receive a tube, conduit or pipe of smaller diameter than the opening or bore. As used in the immediate context, the term "fitting" is intended to encompass a variety of different structures including, but not limited to, a relatively large pipe or conduit which is to be telescopingly engaged with a smaller pipe or conduit inserted thereinto, and retained in the telescoping relationship by means of the retention function accomplished by the present invention.

Positioned on the interior peripheral surface of the fitting is an annular seat forming the situs for the positioning of a portion of a spring metal retainer ring which is disposed on the interior of the fitting. The spring metal retainer ring is a unitary metallic structure which includes three major sub-elements. Thus, the retainer ring includes an annular base band which abuts the seat formed in the fitting, and a plurality of circumferentially spaced, radially inwardly projecting tabs which are inclined at an angle with respect to an axis projecting through the center of the circular opening, or coinciding with the axis of the cylindrical bore formed in the fitting. The radially inwardly projecting tabs incline from the base band in the direction of the interior of the fitting or, stated differently, away from an adjacent outer opening to the fitting through which the tubing or conduit to be joined thereto will be extended in the course of forming or establishing the connection. The retainer ring further includes a plurality of circumferentially spaced, radially outwardly extending anchor tabs or teeth which, in a preferred embodiment of the invention, form an obtuse angle with the base band, and extend therefrom in the opposite direction from the direction of extension therefrom of the radially inwardly directed tabs.

The fitting is further constructed to provide an annular abutment ridge or shoulder, or in the alternative, an annular groove adjacent the seat. The anchoring teeth project into this annular groove or against the ridge when the retainer ring is mounted in the fitting.

In a different aspect, the invention relates to the combination of a conduit or tubular member joined to the fitting and the retainer ring assembly described so as to form an operative joint.

The invention, in other aspects, further relates to special and unique forms of synthetic resin fittings employed in association with spring metal retainer rings of the type described as utilized for various purposes.

An important object of the invention is to provide an improved threadless joint in which a spring metal retainer ring is employed on the interior of a fitting or conduit for the purpose of engaging and retaining a conduit inserted through an opening in the fitting, or into a cylindrical bore in a relatively larger conduit.

Another object of the invention is to provide various fittings of the construction described in which certain interlocking closure members can be quickly snapped into position to close or blank off certain openings in such fittings which are not to be used, and which can be quickly and manually connected to various types of conduit used for containing electrical conductors or the like in providing electrical service systems.

Another object of the invention is to provide a combination pipe fitting and retainer ring which can be used for effecting the joinder of pipe sections to each other through the fitting in an expeditious and easily effected fashion.

Additional objects and advantages of the invention will become apparent as the following detailed description of certain preferred embodiments of the invention is read in conjunction with the accompanying drawings which illustrate these embodiments.

GENERAL DESCRIPTION OF THE DRAWINGS

FIG. 1 is a side elevation view of a joint or pipe coupling in which a pair of pipes are joined through the fitting and retainer ring combination of the present invention.

FIG. 2 is a sectional view taken along line 2—2 of FIG. 1.

FIG. 3 is an end elevation view of a spring metal retainer ring utilized in the fitting and retainer ring combination of the invention.

FIG. 4 is a sectional view taken along line 4—4 of FIG. 3.

FIG. 5 is a plan view of a quick connect electrical junction box having double and single socket insert couplings constructed in accordance with the present invention mounted therein for purposes of quick securement of threadless conduits to said box through said socket inserts.

FIG. 6 is a sectional view taken along line 6—6 of FIG. 5.

FIG. 7 is a sectional view taken along line 7—7 of FIG. 5.

FIG. 8 is a sectional view taken along line 8—8 of FIG. 6.

FIG. 9 is a view in elevation of a blank insert used for blocking off or closing one of the openings into the electrical box shown in FIG. 5 when a single socket insert coupling is not to be used in the opening.

FIG. 10 is a side elevation view of the blank insert shown in FIG. 9 as it appears when viewed from the opposite side thereof from the side illustrated in FIG. 9.

FIG. 11 is a sectional view taken along line 11—11 of FIG. 10.

FIG. 12 is a plan view of a blank insert having a stud mounting flange formed integrally therewith for use in an electrical box of the type shown in FIG. 5.

FIG. 13 is a side elevation view of the blank insert shown in FIG. 12.

FIG. 14 is a sectional view taken along line 14—14 of FIG. 13.

DETAILED DESCRIPTION OF PREFERRED EMBODIMENTS OF THE INVENTION

Figure 15:
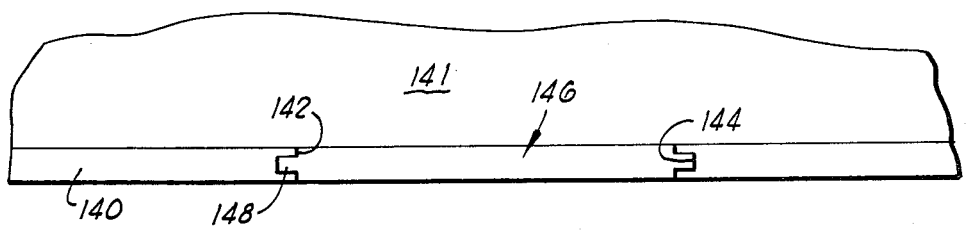
FIG. 15 is an enlarged plan view of a portion of a quick connect electrical box having a modified embodiment of a blank insert inserted in the single socket opening formed in one side of the box.

Referring initially to FIG. 1 of the drawings, a pipe coupling structure which includes the principles of the present invention is illustrated and includes a tubular pipe fitting, designated generally by reference numeral 10, which fitting has a generally cylindrical body 12 having belled female end collars 14 and 16 formed on opposite ends thereof. The fitting 10 further includes a fastener flange 18 which is molded integrally with one side of the cylindrical body 12 at a location intermediate the belled end collars 14 and 16. The fastener flange 18 projects tangentially with respect to the cylindrical body so as to provide a protuberance which may be used to fasten the fitting 10 to a stud, wall or other structure by extension of a screw of similar fastening element through an opening 20 formed in the flange 18. In a preferred construction, the fitting 10 is made of a synthetic resin and is molded as an integral unitary structural element.

The interior of the fitting 10 is illustrated by the sectional view depicted in FIG. 2 of the drawings. It will be noted that a radially extending annular shoulder 22 is formed at the location where the belled end collar 14 is joined to the cylindrical body 12, and that the radially extending annular shoulder intersects an inclined surface 24 which is beveled inwardly at an acute angle with respect to the projected central axis of the cylindrical body 12. It will also be noted that an annular groove or recess 26 is formed in the interior wall of the belled end collar 14 at a location which is axially spaced in relation to the shoulder 22.

The opposite end of the fitting 10 is formed similarly to that at which the belled end collar 14 is located. Thus, the belled end collar 16 at the other end of the fitting 10 also includes a radially extending, annular shoulder 28, a beveled surface 30 which inclines radially inwardly and axially from the shoulder 28, and a groove or recess 32 formed in the interior wall of the belled end collar 16 and spaced axially in the end collar from the shoulder 28. It will also be noted in referring to FIG. 2 that the generally cylindrical body 12 has a radially inwardly extending rib 34 formed around the central interior portion of the body for a purpose hereinafter described. The internal walls of the end collars 14 and 16 may be considered as defining counterbores in relation to the bore through the cylindrical body 12.

As a second major element of the fitting and retainer ring combination of the present invention, a spring metal retainer ring 36 is utilized in conjunction with the fitting 10, and such ring is illustrated in detail in FIGS. 3 and 4 of the drawings. The retainer ring 36 includes an annular base ring or band of L-shaped cross-section which in turn is constituted by an axially extending annular band element 38 and an integrally formed, radially inwardly extending annular band element 40 which is joined to the axially extending band element through a ring angle band. In referring to FIG. 2, and viewing this figure in conjunction with FIGS. 3 and 4, it will be noted that the axially extending annular band elements 38 of the spring metal retainer rings 36 seat immediately adjacent, or against, the internal walls of the respective belled collars 14 or 16 when the radially inwardly extending annular band elements 40 are abutted against the respective shoulders 22 and 28.

When the spring metal retainer rings 36 are so positioned in the opposite ends of the fitting 10, a plurality of outwardly flaring or radially outwardly extending anchor tabs or teeth 42 project into the respective grooves or recesses 26 and 32 formed on the interior surfaces of the respective belled end collars 14 and 16. The radially outwardly extending anchor tabs 42 will be perceived in referring to FIG. 4, to project radially outwardly with respect to the axially extending band element 38, and to form an obtuse angle of from about 155° to about 170° therewith. Moreover, it will be perceived that the anchor tabs 42 project in a generally axial direction from the axially extending annular band element 38, and that the anchor tabs 42 are circumferentially spaced from each other around the band element 38. Further, in referring to FIG. 2, and comparing the configuration of the spring metal retainer ring 36 as it appears in its operative position with the configuration of this structure as shown in FIGS. 3 and 4, it will be noted that the anchor tabs 42 are slightly deformed radially inwardly, and are forced into an interlocking position with respect to the grooves or recesses 26 and 32 by elastic deformation. Thus, the retainer rings 36 used at opposite ends of the tubular pipe fitting 10 are snapped into position, and are retained in the operational position by the resilient deformation of the anchoring tabs 42 and their engagement with the respective grooves 26 and 32 formed in the belled end collars 14 and 16.

Projecting radially inwardly from the radially innermost edge of the annular band element 40 are a plurality of radially inwardly projecting tabs 44 which are interconnected at their bases by arcuate webs 45. In the relaxed or unstressed status of the retainer ring 36, the tabs 44 project at a relatively large acute angle of from about 150° to about 170° with respect to the radially inwardly projecting annular band element 40. It will be noticed, moreover, in referring to FIG. 3, that the tabs 44 are circumferentially spaced in relation to each other around the opening through the retainer ring 36, and that these tabs are approximately twice as wide as the anchor tabs 42. Finally, in referring to FIG. 2, it will be noted that the radially inwardly projecting tabs 44 are distorted outwardly from their relaxed or normal status, as shown in FIGS. 3 and 4, when they are placed in the fitting 10 and used for engaging a pipe or conduit, and the character of this distortion and the way in which the retainer ring functions will be subsequently explained in greater detail.

In utilizing the double ended pipe fitting and retainer ring combination shown in FIGS. 1 and 2 for the purpose of coupling or joining a pair of tubular members 50 and 52 to each other, the opposed ends of two tubular members are axially aligned and are coupled through the use of the fitting and ring combination as shown. Initially, one conduit 50 is moved to insert an open end thereof through the opening in the belled end collar 14. As the pipe or conduit section 50 is forced inwardly, the radially inwardly projecting tabs 44 (which initially project more nearly normal to the longitudinal axis of the generally cylindrical body 12, and are then divergent from the beveled surface 24), are forced in an axial direction, and are also forced radially outwardly to pass the inserted end of the conduit 50. The tabs 44 can yield to permit this passage of the conduit 50, but, in yielding, are loaded in elastic deformation, and tend to spring inwardly against the outer peripheral wall of the conduit 50.

Ultimately, the open end of the conduit 50 will come to bear against the radially inwardly projecting rib or stop ring 34 formed in the center of the fitting 10. After becoming thus seated, the coupling of this conduit to the cylindrical body 12 of the fitting 10 is completed. Any effort to extricate or pull out the conduit 50 by applying a force in an axial direction therealong will be resisted by the necessity for the radially inwardly projecting tabs 44 to spring further inwardly in a radial direction in order to move in the same direction as the conduit will tend to move at this time. Such movement cannot be accommodated by the tabs 44 which, at this time, will act as columns loaded in compression, and the force transmitted through the tabs 44 to the L-shaped base band, which includes the band elements 38 and 40, will ultimately be opposed and resisted by the continuous annular ring constituted by the belled end collar 14.

Cooperating with these structures which resist radially outward displacement of the tabs 44 when an extricating force is applied to the conduit 50 is the resistance to axial movement of the retainer ring 36 which is afforded by the engagement of the radially outwardly extending anchor tabs 42 with the groove or recess 26 formed in the belled end collar 14. It will thus be seen that a tenacious and firm interlock is provided which positively couples the conduit 50 to the cylindrical body 12 of the fitting 10.

It is believed that it will be apparent that an identical action is used to engage a second conduit 52 with the opposite end of the fitting 10. Thus, when both of the conduits 50 and 52 are thus assembled with the tubular pipe fitting 10, a secure coupling or joint is formed without the use of threads, and without the necessity to in any way machine or specially configure the conduits 50 and 52.

FIGS. 5–7 illustrate a quick connect electrical junction box 53 which is constructed to slidingly receive and interlock with socket insert couplings constructed in accordance with the present invention. The junction box is substantially rectangular in configuration, and includes side walls 54, 56, 58 and 60 and a bottom wall 59. The walls 54 and 58 are provided with deep, single socket cavities or recesses 62 and 64, respectively, at the central portion thereof, and each of these cavities or recesses terminates in a semi-circular bottom for a purpose hereinafter described. The walls 54 and 58 are also provided with inwardly extending closure fastener tabs, 65 and 66, respectively. The fastener tabs 65 and 66 are apertured to receive suitable screws or fastener elements extended through a cover plate 68 which is secured across the top of the several side walls to close the box in the manner illustrated in FIG. 6. The cover plate 68 is characterized in having an integrally molded peripheral interlocking flange 67 projecting downwardly from the lower side thereof (see FIG. 8).

The walls 56 and 60 which are opposite each other are provided with centrally disposed double socket recesses or cavities 69 and 70, respectively, which are each dimensioned to receive and accommodate a double socket insert coupling or fitting in the manner hereinafter described.

In the illustrated usage of the junction box, a double socket insert fitting 72 is placed in the recess 69 and interengaged with the side wall 56 of the box to accommodate and receive a pair of electrical service conduits 74 and 76 constructed of synthetic resin. A single socket insert fitting 78 is located in an interlocking fashion in the recess 62 formed in the wall 54 and functions to accommodate a single electrical service conduit 80. The recess or opening 64 formed in the wall 58 is closed by a blank insert 82 and the double socket insert fitting-accommodating recess 70 in the wall 60 is closed or blanked off by means of a blank insert 84.

The construction and configuration of the double socket insert fitting 72 (as well as of the single socket insert fitting 78) is illustrated by FIGS. 5–8. The double socket insert fitting 72 includes a peripherally grooved plate 86 which has a peripheral groove 88 formed around the opposite sides and bottom thereof. The groove 88 is dimensioned to slidingly receive the edge of the wall 56 which defines the recess 69. Thus, the plate 86 can be slid into the recess 69 to fill this recess and afford connection of the conduits 74 and 76 to the junction box 53 in the manner hereinafter described. Extended across the upper side of the plate 86 at a location just spaced outside the box as defined by the plan of the side wall 56 is a cover plate-engaging groove 90. The groove 90 is dimensioned to receive and register with the peripheral flange 67 carried on the underside of the cover plate 86 when the socket fitting 72 is in the use and the cover plate is secured over the open top side of the box.

A pair of short tubular socket elements 92 and 94 are molded integrally with the plate 86, and project normal to the plane of this plate on the opposite side thereof from the interior of the box. Each socket element defines a counterbore 96 and a bore 98 which intersect and coaxially communicate at the location of a radial shoulder 100. A radially inwardly projecting annular rib 102 is formed around the interior of each socket element at a location intermediate the length of the respective counterbore 96. An annular groove 103 is formed around the interior of each socket element at a location intermediate the length of the respective bore 98. It should here be pointed out that an annular rib, such as the rib 102, or an annular groove, such as the groove 103, can be used interchangeably as an anchoring situs for the retainer rings 36, as will be described.

Each of the bores 98 is projected a short distance into the plate 86 and terminates at an annular, radially inwardly projecting shoulder 104. This shoulder 104 projects radially inwardly to an annular beveled surface 106 which terminates inwardly at a central opening or passageway 108 through the plate 86. A stop ring 110 is formed on the inner side of the plate 86 around the opening 108, and projects radially inwardly with respect to this opening so as to form a stop against which the end of a pipe or conduit can be abutted as hereinafter described.

Each of the tubular socket elements 92 and 94 receives on the interior thereof, one of the retainer rings 36 of the type shown in FIGS. 3 and 4. A retainer ring 36 can be positioned within each of the socket elements 92 and 94 at either one of two optional positions. First, for the receipt and accommodation of relatively large diameter pipe or conduit, the retainer ring 36 can be positioned with the annular band element 38 bearing against the interior of the counterbore 96 and the outwardly projecting anchor tabs 42 abutting against the annular rib 102. When so positioned, the band element 40 bears against the annular shoulder 100, and the radially inwardly projecting anchor tabs 44 then project into the bore 98. When a relatively large retainer ring 36 is used in this fashion, a large diameter conduit having a diameter which is slightly less than that of the counterbore 98 is coupled to the fitting, and specifically to the respective socket element containing such retainer ring, by inserting the open end of the conduit through the opening to the counterbore 96, and continuing the movement of the conduit into the socket element 92 until the end of the conduit abuts the radially inwardly projecting shoulder 104. The interlocking and retaining action of the retainer ring 36 then comes into play to prevent extrication of the conduit or pipe from that particular socket element 92 or 94 into which it is inserted.

In an alternate manner of usage of one of the socket elements 92 or 94, as shown in FIG. 8, a relatively smaller diameter retainer ring 36 is placed on the interior of the respective socket in the bore 98. Here, the outwardly projecting anchors tabs 42 register with the recess 103 formed in the bore 98, the annular band element 38 bears against the peripheral wall which defines this bore, and the band element 40 abuts the annular shoulder 104. The radially inwardly directed tabs 44 project inwardly at a steeper angle than the angle of the beveled surface 106 until a relatively small diameter pipe or conduit, such as the conduit 74, is inserted in the respective socket element. At this time, the tabs 44 are elastically deformed outwardly to pass the end of the conduit and permit the conduit to be moved inwardly until its end abuts the stop ring 110. The engaging action of the tabs 44 then again becomes effective to prevent extrication of the conduit.

Although the foregoing description has explained and referred to the details of construction of the double socket insert fitting 72, the single socket insert fitting 78 is very similarly constructed to the double socket fitting. Thus, the single socket insert fitting 78 also includes a peripherally grooved plate 112, a peripheral groove 114 around three sides of this plate for registering with, and engaging, that edge of the side wall 54 which defines the recess 62, and a tubular socket element 116 which projects normal to the plane of the plate 112 on the other side of the junction box 53. The stop ring 118 formed on the inner side of the plate 112, and located on the interior of the junction box when the single socket insert fitting 78 is in place, can be perceived in FIG. 5.

Often, in the use of the junction box 53, the electrical connections which are to be effected within the junction box will contemplate the extension to the box of a number of electrical conduits which is less than the total number which could be accommodated if insert fittings of the double and single socket types were used in all of the cavities or recesses formed in the four side walls of the junction box. In other words, while a junction box constructed as illustrated in the disclosed embodiment can accommodate two double socket insert fittings and two single socket insert fittings, it is often desirable to use a lesser number than all of such socket insert fittings, and this usage is typified by the arrangement illustrated in FIGS. 5-7 where only a single one of the double socket insert fittings 72 is in use, as well as one of the single socket insert fittings 78.

In this type of usage, it is desirable to blank off or close the cavities or recesses in the remaining side walls which are not in use to accommodate and receive active socket insert fittings. For this purpose, blank inserts 82 and 84 of the sort illustrated in position in the plan view in FIG. 6, and illustrated in greater detail in FIGS. 9-11, are employed. Since, except for their width dimension, a blank insert 82 used to blank off or close a junction box recess or cavity sized to accommodate a single socket insert fitting is constructed identically to a blank insert 84 used to blank off or close one of the cavities or recesses dimensioned to receive a double socket insert fitting, the description of the construction details of these blank inserts will be confined and limited to the description of the single blank insert. This element, in FIG. 5, is identified by reference numeral 82, and as here shown, and as shown in FIGS. 9-11, includes a central plate 120 which has a peripheral enlargement or flange 122 extending around the sides and bottom thereof. The curvature of the sides of the central plate 120 and the flange 122 accords to the curvature of the edge of the wall 58 which defines the recess or cavity 62. Formed in the peripheral flange 122 is a groove 124 which is dimensioned to register with, and receive, the edge or boundary of the wall 58 adjacent the recess or cavity 64. Thus, the blank insert 82 can simply be slipped into position, as shown in FIG. 5, to completely block or blank off the recess or cavity 62 in the wall 58 when this recess or cavity is not to be used in the accommodation of one of the single socket insert fittings 78 of the sort shown in position in the wall 54 of the junction box.

In similar fashion, a blank insert 84 dimensioned to fit into and close the recess or cavity 70 is constructed to include a peripheral groove 126 which receives and registers with that portion of the wall 60 which defines the cavity 70. The construction of the insert blank 84 is, except for its overall dimension, identical to the construction of the insert blank 82.

It is sometimes desirable in some types of installation to modify the construction of the insert blanks which are utilized so as to facilitate, by the use of such blanks, the securement or mounting of the junction box on a stringer or wall stud. In these instances, an insert blank of the sort shown in FIGS. 12-14 can be beneficially employed. For purposes of exemplary illustration, an insert blank of the type used to blank off or close a cavity dimensioned to receive a single socket insert fitting is depicted. As here shown, a modified embodiment of the insert blank includes a central plate 128 having the peripheral flange or enlargement 130 hereinbefore described formed around the outer perimeter thereof. The peripheral flange 130 is grooved at 132 to permit sliding insertion of the blank insert in a wall cavity or recess as hereinbefore described. Secured to the upper portion of one side of the cental plate 128 is a horizontally projecting fastening flange 134 which extends normal to the plane of the central plate 128, and which is provided with a pair of countersunk screw holes or apertures 136 and 138 to permit screws to be passed through the fastening flange 134 into a wall stud, stringer or similar structural element to permit the junction box to be firmly mounted or fastened thereto.

FIG. 15 illustrates a further modification in the construction of the junction box 53, and in one of the blank inserts used to close or blank off one of the socket insert fitting recesses or cavities formed in the wall of the junction box. Here a side wall 140 of a junction box is illustrated, as well as a portion of the bottom or back wall 141 thereof. It will be noted that the side wall 140 terminates adjacent a recess or cavity 142, and that the edge or boundary of the side wall which defines and is adjacent this cavity is centrally slotted or grooved, as indicated by the groove 144. The blank insert utilized to close this recess or cavity is designated generally by reference numeral 146, and it will be perceived in referring to the plan view of FIG. 15 that this type of blank insert is provided with a tongue 148 which projects into the groove 144 to provide the necessary interlocking engagement. It is believed that no illustration is necessary to convey the understanding to the reader that when the junction box 53 is constructed in the manner shown in FIG. 15 to provide walls having grooved edges adjacent the recesses for receiving socket insert fittings, such fittings are then modified to provide the necessary registering tongue around the periphery thereof in place of the groove which characterizes those embodiments of the socket insert fittings 72 and 78 as hereinbefore described.

Figures 16, 17:
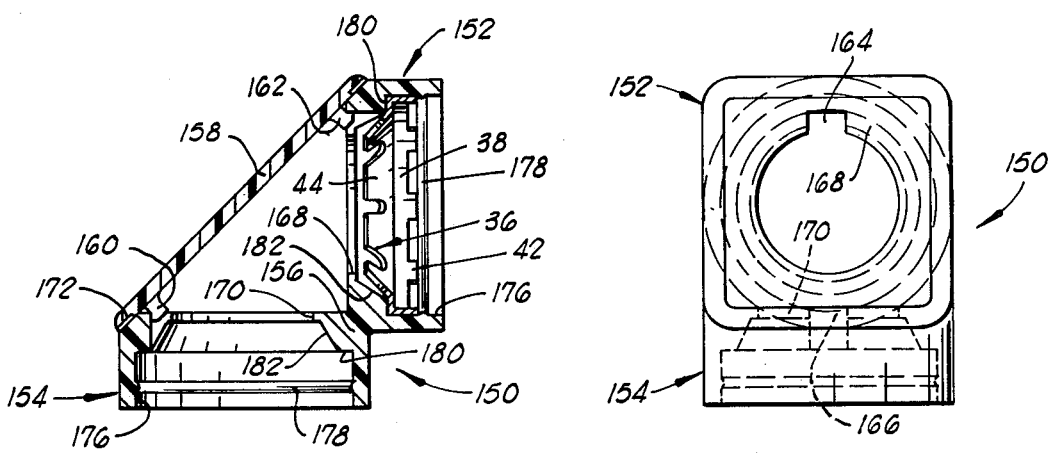
FIG. 16 is a sectional view (taken along line 16—16 of FIG. 17) through the center of a quick connect elbow fitting incorporating the principles of the present invention.
FIG. 17 is a side elevation view of the quick connect elbow fitting depicted in section in FIG. 16.
Figure 18:
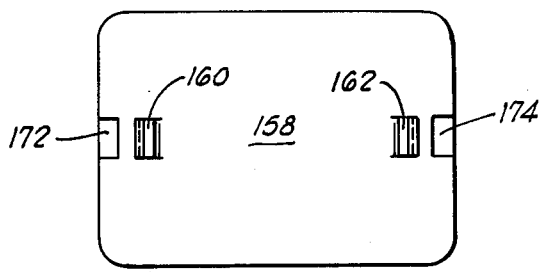
FIG. 18 is a view in elevation of a cover plate utilized in the quick connect elbow fitting of FIG. 16.

In FIGS. 16-18 a quick connect elbow fitting incorporating the principles of the present invention is illustrated. The elbow fitting, designated generally by reference numeral 150, includes a first tubular socket subassembly designated generally by reference numeral 152, and a second tubular socket subassembly designated generally by reference numeral 154. The tubular socket subassemblies 152 and 154 are joined to each other through an interconnecting web portion 156 so that the central axes of the two tubular socket subassemblies extend at right angles to each other. The elbow fitting 150 is thus employed for joining or interconnecting two pipes or conduits at right angles to each other.

For the purpose of closing the fitting across the angle defined between the socket subassemblies 152 and 154, a snap-on cover plate 158 is provided and is illustrated in detail in FIGS. 16 and 18. The snap-on cover plate 158 has a pair of snap-engaging toes 160 and 162 formed on one side thereof, which toes function to engage the respective socket subassemblies 152 and 154 by extension into recesses 164 and 166 in respective stop rings 168 and 170 formed on the interior side of each of the socket subassemblies.

The cover plate 158 also has a pair of slots 172 and 174 formed in the opposite sides thereof to permit an instrument, such as a screwdriver blade, to be inserted in these slots to pry the cover plate off of the elbow fitting 150 to gain access to the interior thereof between the socket subassemblies 152 and 154. Each of the socket subassemblies 152 and 154 is constructed, in its interior, somewhat in the manner hereinbefore described. Thus, a bore 176 is formed in one side of each of the socket subassemblies and an annular rib 178 extends around this bore at a location intermediate the length of the bore. At its inner end, the bore terminates in a radially extending shoulder 180, which shoulder projects inwardly in the respective socket subassembly until it intersects a beveled surface 182. The beveled surface 182 extends to the inner side of the socket subassembly where it intersects the respective stop ring 168 or 170. Both of the socket subassemblies 152 and 154 are substantially identically constructed in the manner described.

In the elbow fitting 150 illustrated in FIG. 10, one of the retainer rings 36 has been pressed into the socket subassembly 152. In the seated position, the radially outwardly projecting anchor tabs 42 have been deformed inwardly to where they are in substantially coplanar alignment with the axially extending annular band element 38. The tabs abut against the annular rib 178 which cooperates with the shoulder 180 in maintaining the retainer ring 36 in the proper position within the socket subassembly 152. The radially inwardly projecting tabs 44, prior to the time that a conduit or pipe is inserted in the socket subassembly 152, project inwardly at a steeper angle than the angle at which the surface 182 is beveled, and are shown in this position in FIG. 16. As has been previously explained, when a pipe or conduit is pressed into the socket subassembly 152 by insertion of one end thereof, the radially inwardly projecting tabs 44 will be elastically deformed outwardly to pass the end of the pipe or conduit.

The same relationship will exist between the socket subassembly 154 and a second retainer ring 36 at such time as such second retainer ring is pressed into this socket subassembly to a position identical to that shown for the retainer ring located in the socket subassembly 152.

Figure 19:
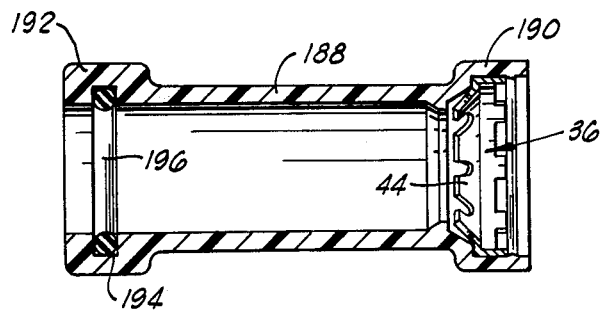
FIG. 19 is a quick connect expansion coupling incorporating the fitting and retainer ring combination of the present invention.

In FIG. 19 of the drawings, a quick connect expansion coupling incorporating the fitting and retainer ring combination of the present invention is illustrated. The expansion coupling includes an elongated cylindrical body 188 which is provided at one end with a belled end collar 190 having an interior formed in the manner hereinbefore described for receiving one of the retainer rings 36. At its opposite end, the cylindrical body 188 has an external enlargement 192 formed thereon, which enlargement is internally grooved by an annular groove 194 for the reception of a sealing ring 196 of elastomeric material. In the use of the expansion coupling shown in FIG. 19, a pipe or conduit is inserted into the belled end collar 190 of the expansion coupling until it passes through and becomes engaged by the radially inwardly projecting tabs 44 of the retainer ring 36. A second pipe or conduit of very slightly lesser external diameter than the internal diameter of the cylindrical body 188 can then be extended through the opposite end of the expansion coupling and passed through the sealing ring 196 so as to be in sealing engagement therewith.

It will be perceived that in use, the expansion coupling can be employed to permit an axially shifting movement of that conduit or pipe inserted in the end of the expansion coupling containing the sealing ring 196 without loss of the coupling function. In other words, as this pipe or conduit slides axially, sealing contact is maintained with the sealing ring 196 while such axial movement is accommodated within the length of the cylindrical body 188. The pipe or conduit secured to the coupling at its other end by means of the retainer ring 36 does not shift in relation to the coupling, but remains fixed by reason of the anchoring function of the retainer ring hereinbefore described.

Although certain preferred embodiments of the present invention have been herein described in order to facilitate a thorough understanding of the principles which underlie the combination pipe fitting and retainer ring of the invention, it will be understood that certain modifications and changes in the illustrated and described structure can be effected without departure from these basic principles. Changes and innovations of this type are therefore deemed to be circumscribed by the spirit and scope of the invention except as the same may be necessarily limited by the appended claims or reasonable equivalents thereof.

What is claimed is:

1. In combination, a pipe fitting and retainer ring comprising:
    a fitting having a hollow interior defined by an internal wall, and having an opening in one side thereof communicating with said hollow interior, said fitting further defining an interior seat on said hollow internal wall and extending around said hollow interior;
    a spring metal retainer ring in said fitting around said hollow interior and including:
        a continuous, endless band seated on said seat;
        a plurality of spaced anchor tabs projecting outwardly from said band in a direction generally away from the hollow interior of said fitting and in the direction of said opening into the hollow interior; and
        a plurality of pipe-gripping tabs projecting from said band inwardly into said hollow interior and collectively disposed around said hollow interior, said pipe-gripping tabs further projecting from said band in a direction away from said opening and protruding radially inwardly from said seat to a protuberant inward position for engagement with the outer surface of a pipe inserted into said fitting; and
    means on said internal wall cooperating with said anchor tabs to prevent shifting of the band and anchor tabs of said spring metal retainer ring in relation to said fitting while allowing a pipe to be inserted through said spring metal retainer ring by deflection of said pipe-gripping tabs.

2. The combination defined in claim 1 wherein said fitting is generally cylindrical in configuration and the opening into the hollow interior of said fitting is circular.

3. The combination defined in claim 1 wherein said band is circular in configuration and said tabs are spaced circumferentially from each other around said band.

4. The combination defined in claim 1 wherein said fitting is a synthetic resin material.

5. The combination defined in claim 3 wherein said band includes:
- a first band element in the form of a flat ring having all portions thereof spaced substantially equidistantly from the center of said hollow interior, and having said anchor tabs secured thereto; and
- a second band element in the form of a flat, substantially monoplanar ring joined to said first band element and projecting normal thereto and radially toward said hollow interior therefrom, said second band element having said pipe-gripping tabs secured thereto.

6. The combination defined in claim 1 wherein said means on said internal wall cooperating with said anchor tabs comprises an annular groove in said internal wall and adjacent said seat and receiving said anchor tabs.

7. The combination defined in claim 1 wherein said means on said internal wall cooperating with said anchor tabs comprises an annular rib projecting from said internal wall into the hollow interior of said fitting at a location adjacent said seat and having said anchor tabs bearing thereagainst.

8. The combination defined in claim 1 and further characterized as including an annular, radially inwardly extending rib on said internal wall on the opposite side of said retainer ring from said opening for limiting the distance a pipe can move through said fitting after extension of an end thereof through said opening and retainer ring.

9. The combination defined in claim 1 wherein said interior seat comprises an annular radial shoulder in said internal wall and abutting said band to limit movement of said band away from said means cooperating with said anchor tabs.

10. The combination defined in claim 5 wherein said seat comprises:
- a radial shoulder in said internal wall bearing against said second band element; and
- a beveled surface projecting radially inwardly toward said hollow interior from said radial shoulder and inclining away from said opening.

11. The combination defined in claim 1 and further characterized as including means on said fitting for detachably interconnecting said fitting with an electrical junction box.

12. The combination defined in claim 2 wherein said band is circular in configuration and said tabs are spaced circumferentially from each other around said band.

13. The combination defined in claim 12 wherein said fitting is a synthetic resin material.

14. The combination defined in claim 13 wherein said seat comprises an annular radial shoulder in said internal wall and abutting said band to limit movement of said band away from said means cooperating with said anchor tabs.

15. The combination defined in claim 14 and further characterized as including:
- a second fitting configured identically to said first fitting; and
- web means interconnecting said first-mentioned and second fittings so that the axes of the two generally cylindrical fittings extend substantially normal to each other.

16. A coupling device comprising:
- a synthetic resin, tubular fitting of generally cylindrical configuration and having communicating openings at the opposite sides thereof and a central axis extending therethrough between said openings, said tubular fitting further including:
  - a counterbore adjacent at least one of said openings and communicating therewith; and
  - a bore interiorly of said counterbore in said fitting in communication with said counterbore;
  - a radial, annular shoulder defining the axial terminus of said counterbore;
  - a beveled annular surface contiguous to said radial annular shoulder and defining the axial terminus of said bore which is more nearly adjacent said counterbore; and
  - ring-engaging means extending around said counterbore coaxially in said fitting and spaced axially from said shoulder toward said one opening; and
- a retainer ring positioned coaxially in said tubular fitting and including:
  - an annular band between said shoulder and said ring-engaging means and bearing against said shoulder to prevent said ring from moving away from said opening;
  - tabs projecting from the band to said ring-engaging means and cooperating with the ring-engaging means to prevent axial shifting of said band in said fitting toward said opening; and
  - tabs projecting radially inwardly and axially from said band in the direction of said counterbore and at an angle to a plane passed normal to the central axis of the fitting.

17. A coupling device as defined in claim 16 wherein said band includes a substantially monoplanar band element bearing against said annular shoulder.

18. A coupling device as defined in claim 17 wherein said tabs projecting radially inwardly each diverge from said beveled annular surface.

19. A coupling device as defined in claim 16 wherein said band is L-shaped in cross-sectional configuration.

20. A coupling device as defined in claim 16 and further characterized as including stop means adjacent the other of said openings most remote with respect to said counterbore for limiting movement of a pipe through said fitting after passing through said one opening and progressing toward the second opening.

21. A coupling device comprising:
- a synthetic resin, tubular fitting of generally cylindrical configuration and having communicating openings at the opposite sides thereof and a central axis extending therethrough between said openings, said tubular fitting further including:
  - a counterbore adjacent one of said openings and communicating therewith;
  - a bore interiorly of said counterbore in said fitting in communication with said counterbore;
  - a first radial annular shoulder defining the axial terminus of said counterbore;
  - first ring-engaging means extending around said counterbore in said fitting, and spaced axially from said shoulder toward said one opening;
  - second ring-engaging means extending around said bore and spaced axially from said first radial annular shoulder;
  - a passageway of smaller diameter than said bore on the opposite side of said bore from said counterbore and communicating with said bore and with the other of said openings in said fitting, said passageway being of substantially cylindrical configuration and being formed concentrically and coaxially around said central axis;

a second radial annular shoulder adjacent the intersection of said passageway and said bore; and a stop ring at said other opening extending coaxially around said central axis and having a diameter smaller than said passageway; and a spring metal retainer ring positioned in said fitting and including:

an annular band bearing against the internal wall of said fitting and disposed in one of said bore and counterbore and further bearing against one of said radial annular shoulders to prevent the ring from moving away from said one opening;

tabs projecting from said band toward said one opening and into engagement with one of said ring-engaging means; and tabs projecting radially inwardly and axially from said band at an angle to a plane passed normal to the central axis of the fitting, and from the band toward said other opening.

22. A coupling device as defined in claim 21 wherein said band further includes a portion bearing flatly against one of said annular shoulders and having said radially inwardly directed tabs connected directly thereto.

23. A coupling device as defined in claim 21 and further characterized as including means on the outside of said fitting for detachably engaging a junction box.

24. A coupling device as defined in claim 21 and further characterized as including:

a first annular, beveled surface extending between said bore and said first radial, annular shoulder; and a second annular, beveled surface extending between said passageway and said second radial annular shoulder.

25. A coupling device as defined in claim 24 wherein said band further includes a portion bearing flatly against one of said annular shoulders and having said radially inwardly directed tabs connected directly thereto.

26. A coupling device as defined in claim 25 wherein said radially inwardly projecting tabs diverge radially inwardly from the beveled surface adjacent the respective one of said annular shoulders in contact with said portion of said band.

27. A coupling device as defined in claim 22 wherein said annular band further includes a second portion equidistantly spaced at all points from said central axis.

28. An electrical junction box assembly comprising:

a box having a plurality of recessed side walls, each of said side walls having a recess therein which opens at an edge of the respective recessed side wall;

at least one synthetic resin socket insert fitting positioned in, and closing, the recess in at least one of the said side walls, and having openings in opposite sides thereof and a central passageway between the openings, said fitting including:

a plate having a periphery detachably engaging, by a tongue and groove connection, the respective side wall adjacent the recess in which said fitting is position and having said passageway extending therethrough from the exterior to the interior of the box;

a tubular socket element projecting from said plate away from the interior of said box;

a radially extending shoulder extending around said passageway inside said fitting and positioned between a relatively large diameter portion of said passageway and a relatively smaller diameter portion thereof; and a resilient, conduit-engaging retainer ring retained in said fitting and abutting said shoulder, said retaining ring including inclined first tabs projecting into said passageway from said ring for peripherally engaging a conduit extended along said passageway and second tabs projecting in the opposite direction from said first tabs; and means around said passageway spaced from said shoulder engaging said second tabs to prevent shifting of said retainer ring in said passageway.

29. An electrical junction box assembly as defined in claim 28 and further characterized as including at least one blank insert positioned in the recess in at least one of said side walls and including:

a central plate; and an outer peripheral portion around said central plate configured to engage, by a tongue and groove connection, said one side wall adjacent said recess in which the blank insert is positioned.

30. An elbow coupling comprising:

a first tubular socket subassembly of generally cylindrical configuration and having openings on opposite sides thereof;

a second tubular socket subassembly of generally cylindrical configuration and having openings on opposite sides thereof; and a web portion interconnecting said first and second tubular socket subassemblies to orient the axes of said first and second tubular socket subassemblies normal to each other and form an elbow, each of said first and second tubular socket subassemblies comprising:

an internal wall around the hollow interior of the respective tubular socket subassembly and extending between the openings at opposite sides thereof, said internal wall including:

a radially inwardly extending, annular shoulder; and a beveled surface extending radially inwardly and axially in said tubular socket from said radially inwardly extending shoulder;

a stop ring formed around the opening at one side of the respective socket subassembly which is nearest the second of said tubular socket subassemblies; and abutment means spaced along said internal wall from said annular shoulder and on the opposite side of said shoulder from said stop ring;

a closure plate detachably engaging each of said tubular socket subassemblies and extending therebetween for partially forming an enclosure in the space between the adjacent openings at the sides of said tubular socket subassemblies which are nearest each other; and a resilient retainer ring in one of said tubular socket subassemblies and including:

a portion bearing against said annular shoulder; and pipe-engaging tabs projecting radially inwardly from said portion; and additional tabs projecting in the opposite direction within said one tubular socket subassembly from the direction of projection of said pipe-engaging tabs and abutting against said abutment means to prevent axial movement of said retainer ring away from said shoulder.

* * * * *